UNITED STATES PATENT OFFICE.

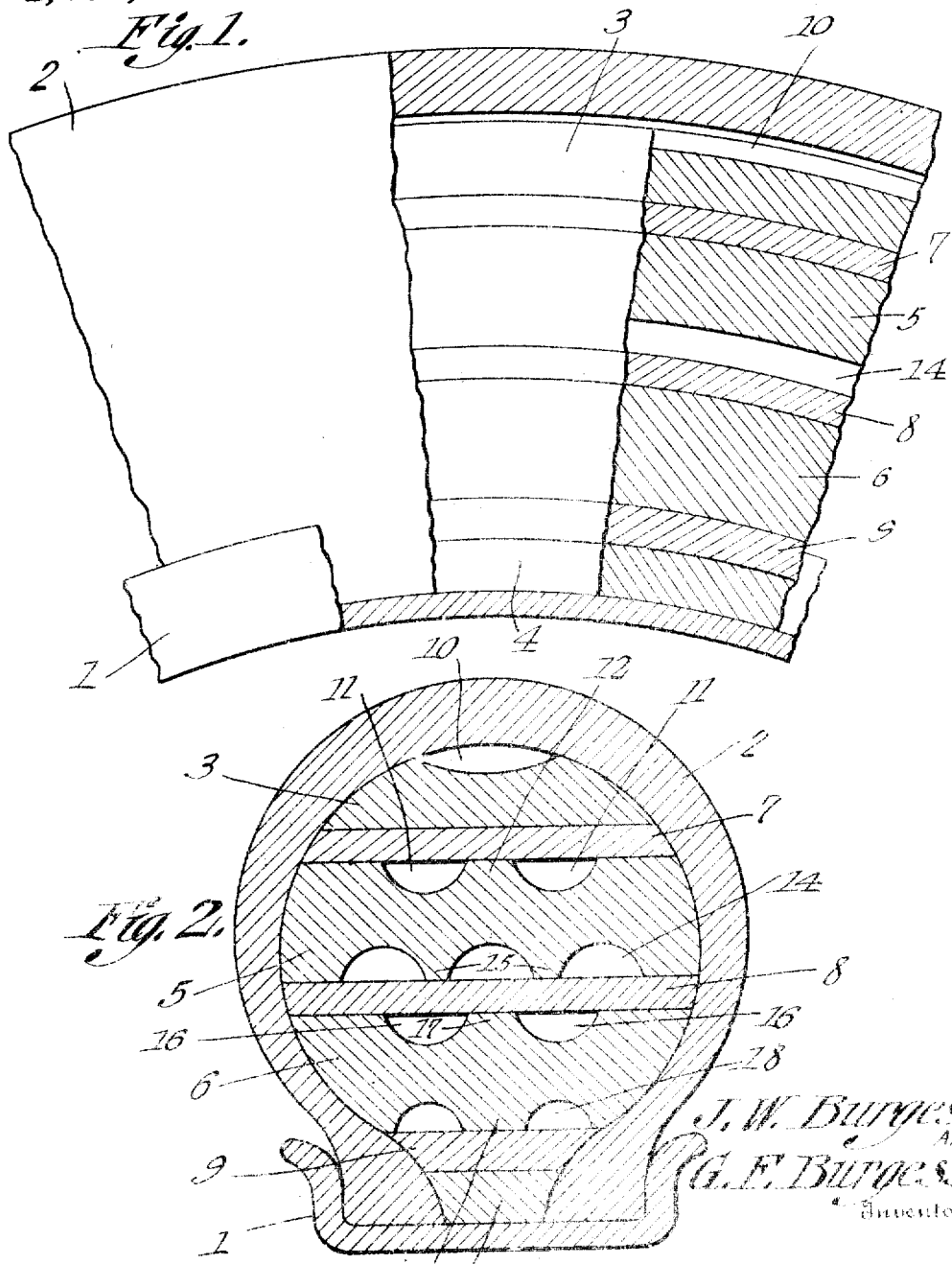

JOHN W. BURGESS AND GEORGE F. BURGESS, OF KANSAS CITY, MISSOURI.

INNER TIRE-CUSHION.

1,283,065. Specification of Letters Patent. Patented Oct. 29, 1918.

Application filed July 18, 1918. Serial No. 245,555.

*To all whom it may concern:*

Be it known that we, JOHN W. BURGESS and GEORGE F. BURGESS, citizens of the United States, residing at Kansas City, in the county of Jackson, State of Missouri, have invented a new and useful Inner Tire-Cushion, of which the following is a specification.

The device forming the subject matter of this application is a filler for a vehicle tire, and the invention aims to provide a device of the kind mentioned which will not be subject to puncture and deterioration.

Another object of the invention is to provide a filler which will have the necessary resiliency at the desired point, and have the necessary capacity for resisting undue distortion.

It is within the province of the disclosure to improve generally and to enhance the utility of devices of that type to which the present invention appertains.

With the above and other objects in view, which will appear as the description proceeds, the invention resides in the combination and arrangement of parts and in the details of construction hereinafter described and claimed, it being understood that, within the scope of what is claimed, changes in the precise embodiment of the invention shown can be made without departing from the spirit of the invention.

In the accompanying drawings:—

Figure 1 is a side elevation wherein parts are broken away and shown in elevation; and Fig. 2 is a cross section.

The numeral 1 marks a rim, with which a casing 2 is assembled in any desired manner. Located within the casing 2 is a filler comprising a resilient tread strip 3, a resilient rim strip 4, a resilient outer strip 5, a resilient inner strip 6, a flexible band 7 between the tread strip 3 and the outer strip 5, a flexible band 8 between the inner strip 6 and the outer strip 5 and a flexible band 9 between the inner strip 6 and the rim strip 4, the last specified band being thicker than the other bands.

The tread strip 3 has an external longitudinal groove 10 along its tread line. The outer surface of the outer strip 5 is provided with longitudinal grooves 11 forming a rib 12, there being longitudinal grooves 14 on the inner surface of the outer strip 5, these grooves defining ribs 15. The ribs 15 are located in alinement with the grooves 11. The outer surface of the inner strip 6 is provided with grooves 16 defining a rib 17, the ribs 15 on the strip 5 being located opposite to the grooves 16. In the inner surface of the strip 6 there are grooves 18 defining a rib 19, the grooves 18 being disposed opposite to the grooves 16. The resilient strips 5 and 6 may be described as being of corrugated construction.

The strips 3, 4, 5 and 6 preferably are made of rubber or of a rubber compound, the bands 7, 8 and 9 being fashioned from canvas, leather or any other suitable flexible material. Preferably the strips and the bands are secured together, by vulcanizing, cementing or in any other way.

The following points lend novelty and utility to the structure, notably when taken in combination:—

Since the tread strip 3 is provided with the groove 10, the tire will yield sufficiently so that a hold on the ground may be obtained. The depth of the groove 10, and, indeed, the depth of the other grooves, will be regulated in accordance with the weight of the car and the load which is to be carried. The bands 7, 8 and 9 serve to hold the filler together, notably against centrifugal separation. These bands are put on under tension, and this tension is sufficient to offset any tendency in the parts of the filler to separate by centrifugal action. The rim strip 4 is solid in cross section, that is, it has no longitudinal grooves. This fact, taken with the further fact that the band 9 is thicker than the other bands, renders the filler unusually strong and compact, adjacent the rim, affording a firm base, and, at the same time, forming a means whereby the longitudinal edges of the casing 2 may be separated laterally and held in engagement with the rim 1.

The filler or cushion forming the subject matter of this application is durable and causes a car to ride well. When the casing 2 becomes worn, the worn casing may be replaced readily by a new one, the filler remaining intact.

Having thus described the invention, what is claimed is:—

1. In a device of the class described, a resilient tread strip, a resilient rim strip, resilient inner and outer strips between the tread and rim strips, a flexible band between the inner and outer strips, a flexible band between the tread and outer strips, and a flexible band between the inner and rim strips, the last specified band being thicker than the other bands, the tread strip having an external longitudinal groove along its tread line, the rim strip being solid in cross section, and the inner and outer strips having longitudinal grooves which face the corresponding bands and define longitudinal ribs, the ribs on the inner surface of the outer strip being disposed in alinement with the grooves on the outer surface of the inner strip, the ribs on the outer surface of the inner strip being disposed in alinement with the grooves in the inner surface of the outer strip, and the grooves on the inner and outer surfaces of the inner strip being alined.

2. In a device of the class described, a resilient tread strip, a resilient rim strip, resilient inner and outer strips between the tread and rim strips, a flexible band between the inner and outer strips, a flexible band between the tread and outer strips, and a flexible band between the inner and rim strips, the inner and outer strips having longitudinal grooves which face the corresponding bands and define longitudinal ribs, the ribs on the inner surface of the outer strip being disposed in alinement with the grooves on the outer surface of the inner strip, the ribs on the outer surface of the inner strip being disposed in alinement with the grooves in the inner surface of the outer strip, and the grooves on the outer and inner surfaces of the inner strip being alined.

3. In a device of the class described, a resilient tread strip, a resilient rim strip, resilient inner and outer strips between the tread and rim strips, a flexible band between the inner and outer strips, a flexible band between the tread and outer strips, and a flexible band between the inner and rim strips, the last specified band being thicker than the other bands, the tread strip having an external longitudinal groove along its tread line, the rim strip being solid in cross section, and the inner and outer strips having longitudinal grooves which face the corresponding bands and define longitudinal ribs.

In testimony that we claim the foregoing as our own, we have hereto affixed our signatures in the presence of two witnesses.

JOHN W. BURGESS.
GEORGE F. BURGESS.

Witnesses:
T. P. CHAPMAN,
CLARENCE E. CAMPBELL.